US006383075B1

(12) United States Patent
Jeong et al.

(10) Patent No.: US 6,383,075 B1
(45) Date of Patent: May 7, 2002

(54) PORTABLE WIRELESS NETWORK GAME APPARATUS AND METHOD THEREOF

(75) Inventors: Dae-Wook Jeong, Kyungki-do; Hyoung-Gun Jeon, Seoul, both of (KR)

(73) Assignee: Gamepark, Inc., Seoul (KR)

( * ) Notice: Subject to any disclaimer, the term of this patent is extended or adjusted under 35 U.S.C. 154(b) by 0 days.

(21) Appl. No.: 09/560,482

(22) Filed: Apr. 28, 2000

(30) Foreign Application Priority Data

Apr. 28, 1999 (KR) .............................................. 99-15146

(51) Int. Cl.$^7$ ................................................ A63F 9/24
(52) U.S. Cl. .......................................... 463/39; 463/31
(58) Field of Search ............................. 463/30, 31, 39, 463/40, 42, 43, 44

(56) References Cited

U.S. PATENT DOCUMENTS

| 5,184,830 A | * | 2/1993 | Okada et al. ................ 273/433 |
| 5,618,045 A | * | 4/1997 | Kagan et al. ................. 463/40 |
| 5,691,979 A | * | 11/1997 | Cadd et al. .................. 370/312 |
| 5,738,583 A | * | 4/1998 | Comas et al. ................. 463/40 |
| 5,797,085 A | * | 8/1998 | Beuk et al. .................... 455/88 |
| 5,999,808 A | * | 12/1999 | LaDue ........................ 455/412 |

* cited by examiner

*Primary Examiner*—Joe H. Cheng
*Assistant Examiner*—Kim T. Nguyen
(74) *Attorney, Agent, or Firm*—Alston & Bird LLP

(57) ABSTRACT

Disclosed is a portable wireless network game apparatus which comprises: a display device displaying graphics; a game program pack including a storage device which stores the game program; a function key unit generating control signals to control operations of the game program; a microprocessor loading the game program stored in the game program pack for executing the game, generating and outputting the graphics signals and audio signals of the game program, transmitting the graphics signals to the display device, receiving the control signals of the function key unit to execute the operations of the game program, and outputting control signals to transmit/receive data of the operations of the game program to/from opponents' game apparatuses; a base band wave generator generating base band carrier waves to transmit the data of the operations of the game program; a transmitter receiving the base band carrier waves and game executing data of the microprocessor, converting the base band carrier waves into carrier waves of a predetermined band, readying the game executing data on the carrier waves and modulating the same, and transmitting the modulated signals to opponents' game apparatuses; and a receiver receiving the modulated signals including the game executing data from the opponent's game apparatus, demodulating the same to the game executing data, and transmitting the game executing data to the microprocessor.

2 Claims, 4 Drawing Sheets

PORTABLE WIRELESS NETWORK GAME APPARATUS AND METHOD THEREOF

BACKGROUND OF THE INVENTION (a) Field of the Invention

The present invention relates to a wireless network game apparatus and method thereof. More specifically, the present invention relates to a portable wireless network game apparatus and method for a plurality of gamers.

(b) Description of the Related Art

Game apparatuses are categorized as an arcade game apparatus, a video game apparatus which is used in connection with a television set, a portable game apparatus, and a computer game apparatus.

Portable game apparatuses such as Tamagochi or Nintendo are very popular among many people because of their portability, but, since only one person can play the above-noted games at a time, the gamer cannot play currently popular network games, and because of the limitation of a processor installed therein, portable game apparatuses cannot support colorful graphics displays.

Computer games are various, and garners who use computer games can play network games via personal computer (PC) communications or the Internet. However, these computer games need expensive computers installed and since computer game apparatuses are not portable, the garners must stay at the place where the PCs are installed.

SUMMARY OF THE INVENTION

It is an object of the present invention to provide a portable wireless network game apparatus and method for a plurality of gamers.

In one aspect of the present invention, a portable wireless network game apparatus for a plurality of garners to play game programs comprises: a display device displaying graphics for playing games; a game program pack removably connected from outside of the game apparatus and including a storage device which stores the game program; a function key unit generating control signals to control operations of the game program; a microprocessor loading the game program stored in the game program pack for executing the game, generating and outputting the graphics signals and audio signals of the game program, transmitting the graphics signals to the display device, receiving the control signals of the function key unit to execute the operations of the game program, and outputting control signals to transmit/receive data of the operations of the game program to/from opponents' game apparatuses; a base band wave generator, connected to the microprocessor, generating base band carrier waves to transmit the data of the operations of the game program according to the controls of the microprocessor; a transmitter receiving the base band carrier waves generated by the base band wave generator and game executing data of the microprocessor, converting the base band carrier waves into carrier waves of a predetermined band, readying the game executing data on the carrier waves and modulating the same, and transmitting the modulated signals to opponents' game apparatuses; and a receiver receiving the modulated signals including the game executing data from the opponents' game apparatuses, demodulating the same to the game executing data, and transmitting the game executing data to the microprocessor.

The carrier waves of the game apparatus for transmitting and receiving signals are the carrier waves having radio frequency (RF) frequency bands.

The transmitter modulates the game executing data by the On/Off Keying (OOK) method.

In another aspect of the present invention, in a plurality of wireless network game apparatuses for a plurality of garners to wirelessly play the games, a portable wireless network game method comprises the steps of (a) loading a game program and executing the same; (b) displaying graphics of the game program on a display device; (c) selecting opponents and a frequency channel; (d) the gamer playing the game by using the graphics of the game program displayed on the display device; (e) readying the game executing data on carrier waves and modulating the same; (f) transmitting the carrier waves to opponents' game apparatuses; (g) receiving the carrier waves including the game executing data of the opponents' game apparatuses from the opponents' game apparatuses; (h) demodulating the game executing data of the opponents' game apparatuses; and (i) processing the game executing data of the opponents' game apparatuses and displaying the same on the display device.

The steps (d) through (i) are repeatedly executed for the gamer to play the game with the opponents.

BRIEF DESCRIPTION OF THE DRAWINGS

The accompanying drawings, which are incorporated in and constitute a part of the specification, illustrate an embodiment of the invention, and, together with the description, serve to explain the principles of the invention

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
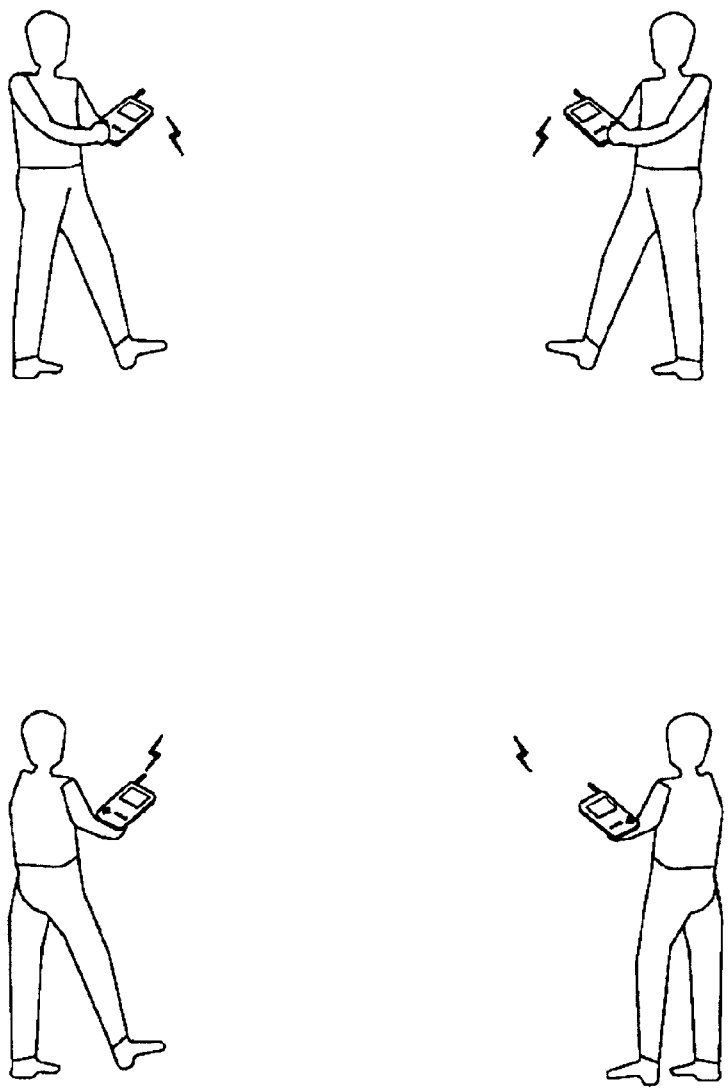
FIG. 1 shows a case when a gamer uses a portable wireless network game apparatus of the present invention.

FIG. 1 shows a case when a gamer uses a portable wireless network game apparatus of the present invention.

As shown in FIG. 1 a plurality of garners play wireless network games using the portable wireless network game apparatuses. The number of garners who play the network game is set or expanded according to the supported game programs and configurations of the game apparatuses.

Figure 2:
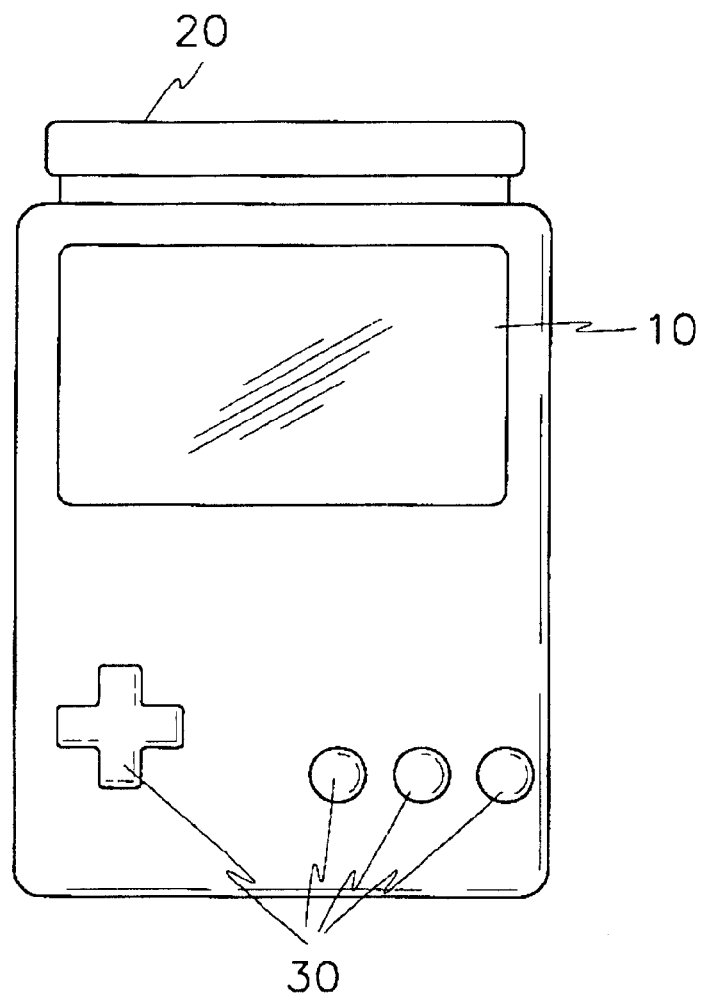
FIG. 2 shows a portable wireless network game apparatus according to a preferred embodiment of the present invention.

An external appearance of the wireless network game apparatus is shown in FIG. 2. A game program pack 20 having built-in game programs is removably connected to the main body of the portable wireless game apparatus.

Figure 3:
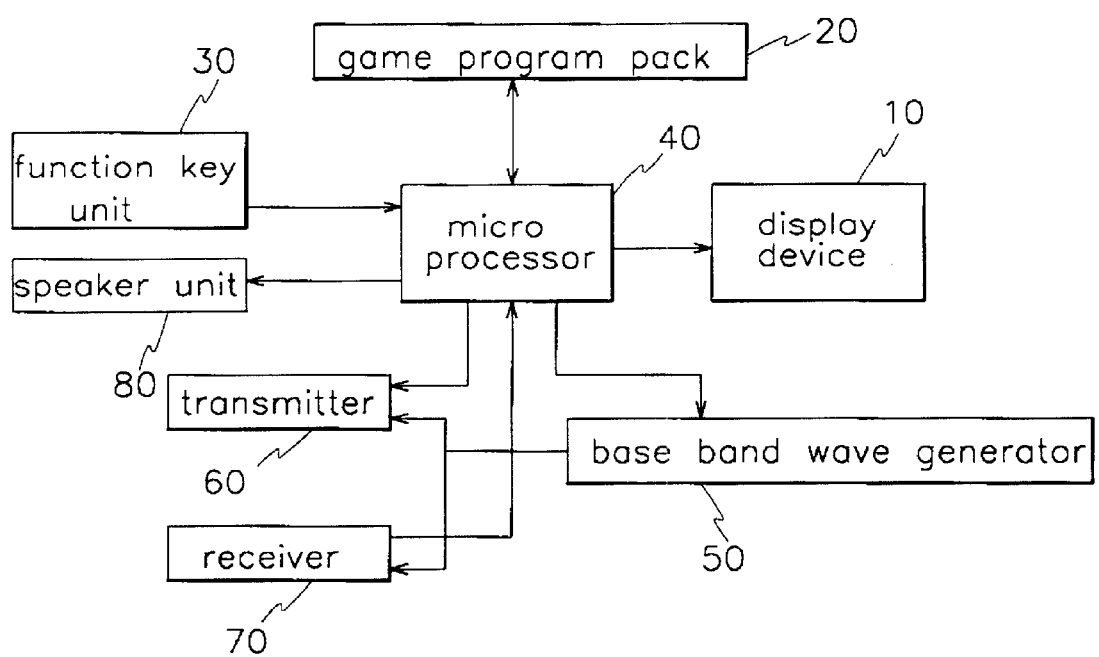
FIG. 3 shows a block diagram of the portable wireless network game apparatus according to a preferred embodiment of the present invention.

FIG. 3 shows a block diagram of the portable wireless network game apparatus according to a preferred embodiment of the present invention.

As shown in FIG. 3, the portable wireless network game apparatus according to the preferred embodiment of the present invention comprises a display device 10, a game program pack 20, a function key unit 30, a microprocessor 40, a base band wave generator 50, a transmitter 60, a receiver 70, and a speaker unit 80. The game program pack 20 is connected to the microprocessor 40, the display device 10 to the microprocessor 40, the function key unit 30 to the microprocessor 40, the speaker unit 80 to the microprocessor 40, the base band wave generator 50 to the microprocessor 40, the transmitter 60, and the receiver 70, the receiver 70 to the microprocessor 40, and the transmitter 60 to the microprocessor 40.

Operations of the portable wireless network game apparatus according to the preferred embodiment of the present invention will now be described referring to drawings.

Figure 4:
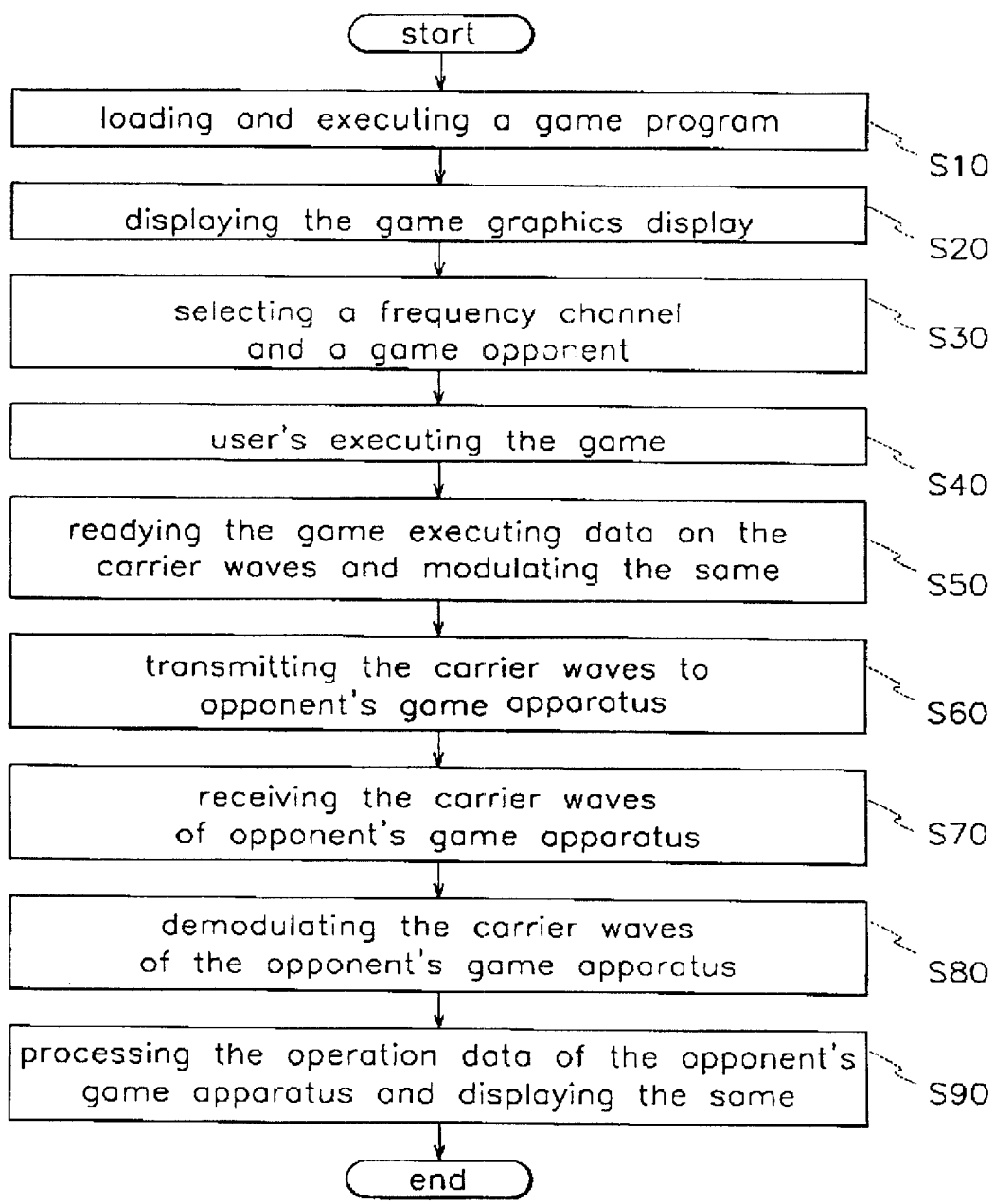
FIG. 4 shows a flow chart of the portable wireless network game apparatus according to a preferred embodiment of the present invention.

FIG. 4 shows a flow chart of the portable wireless network game apparatus according to a preferred embodiment of the present invention.

When the gamer pushes a start button of the function key unit 30 of FIG. 2 in order to play his desired game, a signal which indicates that the gamer pushed the start button is transmitted to the microprocessor 40.

When receiving the signal, the microprocessor 40 loads the game program stored in the game program pack 20 and executes the same in step S10. The microprocessor 40 separates graphics data from the loaded game program and transmits the graphics data to the display device 10. The display device 10 displays the graphics data transmitted from the microprocessor 40 in step S20. At this time, a liquid crystal display (LCD) panel is used as the display device 10.

The gamer selects an opponent and a frequency channel from the graphics of the game program displayed on the display device 10 in step S30. In the present preferred embodiment, radio frequency (RF) frequencies are used as transmit/receive (Tx/Rx) frequencies. It is preferable to use the frequencies having bandwidths of 300~440 MHz or 800~1,000 MHz. When the Tx/Rx frequency bands are divided into a plurality of frequency channels, even if groups of opponents play the game on adjacent frequency bands, the garners do not interfere with each other. That is, if the garners of a group A use a first channel and the garners of a group B use a second channel, since the respective groups use different channels, they do not interfere with each other. The selection of the frequency channels and the opponents can be performed by communications between the opponents, or by displaying menus for selecting the channels and the opponents on the display device of the game apparatus and exchanging necessary data by use of the menus.

After the desired frequency channel and the game opponents are selected, the game is executed in step S40. The execution of the game is performed by computation of the microprocessor 40. The game programs can be network game programs wherein each gamer sequentially play the game, such as a poker card game, or they can be opponent's game programs wherein each gamer independently plays the game, such as Star Craft™. The portable wireless network game apparatus according to the preferred embodiment of the present invention supports both cases.

While the gamers are playing the game, the network game apparatus makes the gamers exchange game executing data with game opponents. In the preferred embodiment of the present invention, the game executing data are wirelessly transmitted and received using the RF frequency bands.

Operations of transmitting the game executing data to opponents' game apparatuses will now be described.

The game executing data are digital data and are generated in the microprocessor 40, and the game executing data generated in the microprocessor 40 are transmitted to the base band wave generator 50.

The base band wave generator 50 readies the game executing data on the base band carrier waves and modulates the same in step S50. The base band carrier waves have frequency bands lower than the frequency bands transmitted from the transmitter 60. In the preferred embodiment of the present invention, the RF waves with about 3~15 MHz bands are used as the frequency bands of the base band carrier waves. In the preferred embodiment of the present invention, the modulation of the base band carrier waves is performed by the On/Off Keying (OOK) method. Further, the Amplitude Shifting Keying (ASK) can also be used to modulate the base band carrier waves.

As described above, the frequency bands of the carrier waves are divided into a plurality of channels, and the selection of the frequency channels among the channels is executed by the user's selection of the function key. The microprocessor 40 transmits to the transmitter 60 a control signal to convert the base band carrier waves into the carrier waves of the frequency channel selected by the function key by the user.

The base band carrier waves modulated from the game executing data are transmitted to the transmitter 60, and the transmitter 60 converts the base band carrier waves into carrier waves of a desired frequency channel according to the carrier wave converting control signal of the microprocessor. At this time, the frequency bands of the carrier waves are RF waves within the ranges of 300~440 MHz or 800~1,000 MHz. Since the RF waves are used as Tx/Rx frequencies between the game apparatuses, the garners have no difficulty in playing the network game against any obstacles. The transmitter transmits the carrier waves which are converted into the desired frequency channel in step S60, A process for receiving the game executing data from opponents' game apparatuses and processing the same will now be described.

The carrier waves transmitted from the opponents' game apparatuses have a frequency channel band identical with the transmitted RF waves.

The receiver 70 receives the carrier waves in step S70, and demodulates the carrier waves into the game executing data in step S80. The demodulated game execution data are transmitted to the microprocessor 40.

The microprocessor 40 separates the graphics data and audio data from the game executing data transmitted from the opponents' game apparatuses, and transmits the graphics data to the display device 10 to be displayed, and the audio data to the speaker unit 80 to output the audio signals in step S90. The gamer understands the opponents' actions through the graphics data and the audio signals, and plays the network game. Thereby, the gamers can play the wireless network game with a plurality of opponents by these Tx/Rx operations.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. In a plurality of wireless network game apparatuses for a plurality of gamers to wirelessly play the games, a portable wireless network game method, comprising the steps of:

(a) loading a game program and executing the same;

(b) displaying graphics of the game program on a display device;

(c) selecting opponents and a frequency channel;

(d) the gamer playing the game by using the graphics of the game program displayed on the display device;

(e) readying the game executing data on carrier waves and modulating the carrier waves;

(f) transmitting the carrier waves to opponents' game apparatuses on the selected frequency channel;

(g) receiving the carrier waves including the game executing data of the opponents' game apparatuses from the opponents' game apparatuses on the selected frequency channel;

(h) demodulating the game executing data of the opponents' game apparatuses; and (i) processing the game executing data of the opponents' game apparatuses and displaying the game executing data on the display device.

2. The method of claim 1, wherein the steps (d) through (i) are repeatedly executed for the gamer to play the game with the opponents.

* * * * *